United States Patent

[11] 3,609,687

[72] Inventor Ivan H. Sublette
Princeton Junction, N.J.
[21] Appl. No. 772,275
[22] Filed Oct. 31, 1968
[45] Patented Sept. 28, 1971
[73] Assignee RCA Corporation

[54] PATTERN RECOGNIZER
5 Claims, 11 Drawing Figs.

[52] U.S. Cl. .......... 340/146.3 R, 250/219 CR
[51] Int. Cl. .......... G06k 9/06
[50] Field of Search .......... 340/146.3

[56] References Cited

UNITED STATES PATENTS

| | | | |
|---|---|---|---|
| 3,182,290 | 5/1965 | Rabinow .......... | 340/146.3 |
| 3,192,505 | 6/1965 | Rosenblatt .......... | 340/146.3 |
| 3,255,436 | 6/1966 | Gamba .......... | 340/146.3 |
| 3,267,431 | 8/1966 | Greenberg et al. .......... | 340/146.3 |

OTHER REFERENCES

Bonner, R. E., " Pattern Recognition with Three Added Requirements," from IEEE Transactions on Electronic Computers, Vol. EC- 15, No. 5, Oct. 66, pp. 770 to 781

*Primary Examiner*—Maynard R. Wilbur
*Assistant Examiner*—William W. Cochran
*Attorney*—H. Christoffersen

ABSTRACT: A pattern recognizer recognizes an unknown pattern by hypothesizing the identity of the unknown pattern and then testing to see whether the identification can be refuted. An identification that cannot be refuted is the correct identification of the unknown pattern.

INVENTOR
IVAN H. SUBLETTE

BY John T. O'Halloran
ATTORNEY

INVENTOR
IVAN H. SUBLETTE

BY John T. O'Halloran
ATTORNEY

INVENTOR
IVAN H. SUBLETTE

BY John T. O'Halloran
ATTORNEY

INVENTOR
IVAN H SUBLETTE
BY John T. O'Halloran
ATTORNEY

PATTERN RECOGNIZER

BACKGROUND OF THE INVENTION

In prior art pattern-recognition machines, such as optical-character-reading machines, the major techniques relied upon for recognition are either mask-matching techniques or feature-extraction techniques. For recognizing printed matter of one or a few different font styles, such techniques are satisfactory. However, when handwritten characters, and more particularly cursive script characters, are to be recognized, the wide variety of styles, shapes, etc. exhibited in handwriting prohibits the use of mask-matching techniques for recognition and makes feature-extraction techniques unreliable. If attempts are made to make feature-extraction techniques reliable, then the recognition hardware becomes so complex as to render the character-reading machine uneconomic.

OBJECT

Accordingly, it is an object of this invention to provide a new and improved pattern recognizer that recognizes handwritten patterns.

SUMMARY OF THE INVENTION

A pattern recognizer in accordance with the invention recognizes an unknown pattern by hypothesizing the identity, i.e., the class, of an unknown pattern and then testing to determine whether the hypothesis can be refuted. The testing of hypotheses about the class of an unknown pattern is carried out with the aid of a plurality of previously identified patterns from each class. These previously identified patterns, which hereafter will be called "examples," are stored in a memory. All patterns, whether unknowns or examples, are represented as matrices of white and black points. However, the term "-point" if used alone in the specification means "black point."

Let $Z$ denote a hypothesized class of the unknown pattern. The pattern recognizer begins an attempt to refute $Z$ by first selecting an array of points in the unknown pattern and then selecting a single point in the unknown not contained in the previously selected array. Next, the pattern recognizer compares all of these points against a plurality of stored class $Z$ examples. When a large number of class $Z$ examples exhibit the array of paints, and a large number of class $Z$ examples exhibit the single point, but few or none of the class $Z$ examples exhibit both the array and the single point, then the hypothesis that the unknown pattern belongs to class $Z$ is refuted. Each of the other possible class hypothesis is similarly tested until a class is found for which no refutation occurs. Such a class is accepted as the class of the unknown pattern.

GENERAL DESCRIPTION

Figure 1:
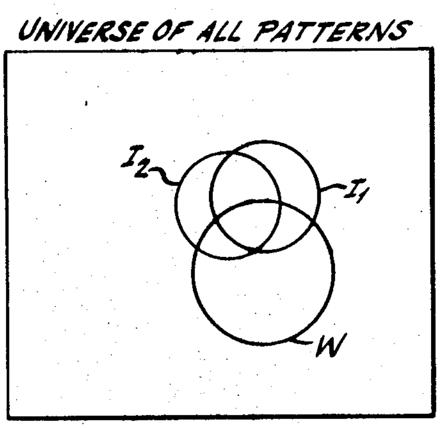
FIG. 1 is a Venn diagram helpful in explaining the recognition technique.

In the following description, a symbol such as $W$ will be used to assert that a certain point, say $p$, is black. In other places, however, $W$ will be used to denote the set of all patterns that are black at the point $p$. This dual interpretation of symbols is used for the sake of convenience. Furthermore, the expression $W \cap Z$, for instance, will denote the set of all patterns that belong to class $Z$ and that are black at the point $p$. the symbol "$\cap$" is the standard symbol for the operation of set intersection.

Probability expressions, such as $P(W|Z)$ and $P(W|V \cap Z)$ will also be used in this description. Symbols appearing in probability expressions should be interpreted as denoting sets of patterns. For instance, $P(W|Z)$ denotes the probability that a pattern drawn at random from the class $Z$ belongs also to the set $W$. As before, $W$ is the set of all patterns that are black at a certain point $p$. Similarly, $P(W|V \cap Z)$ denotes the probability that a pattern drawn at random from the set $V \cap Z$ belongs also to the set $W$. The set $V$ may, for instance, denote the set of all patterns that are black at some point other than $p$.

The recognition technique is based on the following principle: if the class of an unknown pattern has been guessed correctly, than the surprise experienced in observing one part of the pattern will not be increased by the acquisition of additional knowledge about another part of it. In the application of this principle, the intuitive notion of surprise is translated into the precise notion of probability in a manner now to be described.

Let $W$ be an arbitrary black point in the unknown pattern. The measure of surprise experienced in observing $W$ in the unknown pattern, given the hypothesis that it belongs to the class $Z$, is defined to be $1/P(W|Z)$. This is in accordance with the commonly accepted principle that the surprise associated with the occurrence of an event varies inversely with the probability of the event. Let $V$ be another black point in the unknown pattern. Then the surprise experienced in observing $W$, given not only the hypothesis that the unknown pattern belongs to $Z$, but also the fact that it exhibits the black point $V$, is $1/P(W|V \cap Z)$. The change in surprise that occurs in proceeding from the case $W$ alone to the case of $V$ and $W$ is measured by the ratio of these two surprises:

$$K=\frac{1/P(W|Z)}{1/P(W|V \cap Z)} \quad (1)$$

After simplification, equation (1) becomes $$K=\frac{P(W|V \cap Z)}{P(W|Z)} \quad (2)$$

When the ratio $K$ is greater than 1, the surprise has decreased; when $K$ is less than 1, the surprise has increased. The following postulate expresses the principle that the surprise should not increase when the class of the unknown pattern has been guessed correctly.

THE RECOGNITION POSTULATE

When $Z$ is the true hypothesis about the class of the unknown pattern, then $K \geqq 1$ for all $V$ and $W$.

The basic scheme of this recognition procedure can now be stated. If for some unknown pattern and for some hypothesized class $Z$ it can be determined that $K<1$, then the hypothesis that the unknown pattern belongs to $Z$ is refuted. The refutation follows from the fact that the condition $k<1$ is impossible when $z$ is the true or correct class of the unknown pattern. Therefore, an important part of the recognition technique is concerned with determining whether $K<1$.

It is generally impossible to refute a class hypothesis when both $V$ and $W$ are each defined by a single black point of the unknown pattern. Therefore, the set $V$ will be defined in general as the intersection of a plurality of sets, namely $I_1$, $I_2$. . ., and $I_t$, each of which is defined by a single black point. Accordingly, $V$ will be expressed as:

$$V=I_1 \cap I_2 \cap \ldots \cap I_t \quad (3)$$

It has been found that reliability in determining whether $K<1$ increases when a certain subset $J_Z$ is used in place of the class $Z$. $J_Z$ is defined as:

$$J_Z=(V \cap Z) \cup (\overline{G} \cap Z) \quad (4)$$

where $G=I_1 \cup I_2 \cup \ldots I_t$ and the set $\overline{G}$ is the complement of $G$. The symbol "$\cup$" stands for the operation of set union. The effect of using the subset $J_Z$ instead of the entire class $Z$ is to ignore all patterns in class $Z$ except (1) those that exhibit all of the black points used to define $V$ and (2) those that exhibit none of the black points used to define $V$.

Referring to FIG. 1, a Venn diagram shows the relations among the various sets of patterns that have been introduced. The common area of the circles labeled $I_1$ and $I_2$ represents the intersection $V=I_1 \cap I_2$. The entire area inside the perimeters of $I_1$ and $I_2$ represents the set $G$, whereas the entire area outside these perimeters represents the set $\overline{G}$. The set $W$ is shown as another circle, and the common area of the circles $V$ and $W$ represents the intersection $V \cap W$. Since both of the sets $V$ and $W$ are always defined with points that are black in the unknown pattern, the unknown pattern always belongs to the intersection $V \cap W$. The set $Z$, which may intersect the other sets in many different ways, is for the sake of clarity not shown.

The previously introduced surprise ratio is now redefined as:

$$K=\frac{P(W|V \cap J_Z)}{P(W|J_Z)} \qquad (5)$$

It is easily seen that $JZ=Z$ when $t=1$ (when $V=I_1$). Therefore, the definition of $K$ given by equation (5) is consistent with the definition of $K$ given by equation (2). But for the case $t \geq 2$, which in practice will be by far the more frequent case, the definition of $K$ given by equation (5) must be used.

The solution to the problem of determining whether $K<1$ will now be described. The surprise ratio $K$ is a measure of the tendency of patterns that belong to $V \cap J_Z$ or to $W \cap J_Z$ to belong also to the intersection $V \cap W \cap J_Z$. This tendency is large or small as $K$ is large or small. Therefore, if the sets $V \cap J_Z$ and $W \cap J_Z$ each contain many class Z examples and if $K \geqq 1$, then the intersection $V \cap W \cap J_Z$ should also contain many examples. It follows that if $V \cap W \cap J_Z$ on the contrary contains very few examples, or none, then there are grounds for rejecting the hypothesis that $K \geqq 1$. Because of the Recognition Postulate, such a rejection is equivalent to refuting the hypothesis that the unknown pattern belongs to class $Z$.

Accordingly, the hypothesis that the unknown pattern belongs to class $Z$ is refuted if and only if:

1. the sets $V \cap J_Z$ and $W \cap J_Z$ each contain many class Z examples;
2. the set $V \cap W \cap J_Z$ contains very few class $Z$ examples, or none.

Figure 2A:
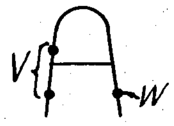
FIG. 2, comprising FIGS. 2*a* and 2*b*, contains representations of patterns that are helpful in understanding the invention.
Figure 2B:
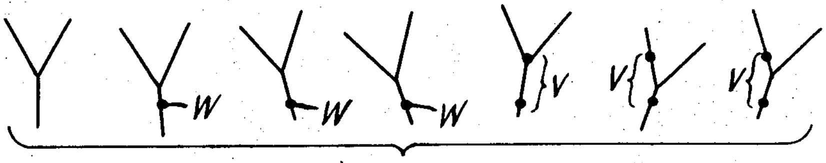

This is illustrated in FIG. 2 wherein an unknown pattern, for instance the handwritten character "A" in FIG. 2*a* is incorrectly hypothesized as belonging to the class of the character "Y." A plurality of different examples of the character pattern Y are stored and, as shown in FIG. 2*b*, the examples are all of different shapes and orientations. It is seen from FIG. 2 that there exist a relatively large number of Y's that exhibit the two black points used to define $V$, and that there exist a relatively large number of Y's that exhibit the black point used to define $W$, but that there does not exist a "Y" that exhibits all three points. Therefore, the hypothesis that the unknown pattern belongs to the class "Y" is refuted. It should be understood of course, that a larger number of examples would be required in practice.

The requirements that the sets $V \cap J_Z$ and $W \cap J_Z$ contain "many" examples and that the set $V \cap W \cap J_Z$ contain "very few" examples must be made more specific. To simplify this problem, and to reduce the complexity of computations required for a refutation, the assumption is made that the two possibilities $K \geqq 1$ and $K<1$ always reduce to the two possibilities $K=1$ and $K=0$, respectively. It is to be understood however, that this technique of pattern recognition does not depend on making exactly this assumption. Deciding that $K=0$ is equivalent to refuting the hypothesis that the unknown pattern belongs to class $Z$, whereas deciding that $K=1$ is equivalent to failing to refute the hypothesis $Z$.

If $K=0$, then it is impossible for a class $Z$ pattern to belong to the intersection $V \cap W \cap J_Z$. Therefore, a necessary condition for deciding that $K=0$ is that $V \cap W \cap J_Z$ contain no class $Z$ examples. This is not a sufficient condition, however, since in general there exists a nonzero probability that $V \cap W \cap J_Z$ contains no examples when $K=1$. Therefore, it is also necessary to compute the probability, $R$, that $V \cap W \cap J_Z$ contains no class $Z$ examples examples, given that $K=1$ and given the observed numbers of examples in the sets $V \cap J_Z$, $W \cap J_Z$, *and* $J_Z$. Then it is decided that $K=0$ if and only if $V \cap W \cap J_Z$ contains no class $Z$ examples and the probability $R$ is small. This decision procedure is in accordance with the well-known principle that a hypothesis should be rejected if it leads to the conclusion that an improbable event has occurred.

Consider now the computation of the probability $R$. Let $N(S)$ denote the number of examples that belong to an arbitrary set $S$, and let $$n=N(J_Z) \qquad (6)$$

$$r=N(V \cap J_Z)=N(V \cap Z) \qquad (7)$$

$$m=N(W \cap J_Z) \qquad (8)$$

$$b=N(V \cap W \cap J_Z)=N(V \cap W \cap Z) \qquad (9)$$

Let $Q$ be the probability that $V \cap W \cap J_Z$ contains $b$ examples, given that $K=1$, and given the observed quantities $n$, $r$, and $m$. Then $$Q=\frac{\binom{r}{b}\binom{n-r}{m-b}}{\binom{n}{m}} \qquad (10)$$

$Q$ is the hypergeometric distribution. Tables of this distribution and a discussion of its various applications is given in the book, *Tables of the Hypergeometric Distribution* by G. J. Lieberman and D. B. Owen, Stanford University Press, Stanford, Calif., 1961. The problem of deciding between $K=0$ and $K=1$ is a special case of what Lieberman and Owen call the problem of testing the equality of two proportions in 2×2 contingency tables (see pages 9 through 11 of their book).

The desired probability $R$, which is the probability that $b=0$, given that $K=1$ and given the observed quantities $n$, $r$, and $m$, is simply the value of $Q$ for the case $b=0$.

Therefore $$R=\frac{\binom{n-r}{m}}{\binom{n}{m}}=\frac{\dfrac{(n-r)!}{m!(n-r-m)!}}{\dfrac{n!}{m!(n-m)!}} \qquad (11)$$

Equation (11) reduces to $$R=\frac{(n-r)!\,(n-m)!}{n!(n-r-m)!} \qquad (12)$$

The procedure for deciding whether $K=0$ can now be stated:

THE REFUTATION TEST Decide that $K=0$ if and only if: 1. $b=0$; (13) (2) $R \leq \epsilon$ (14)

The parameter $\epsilon$ is a preassigned positive constant lying somewhere between 0 and 1. It is clear, however, that a small value of $\epsilon$ is necessary for the reliable operation of the pattern recognizer. Inspection of equation (12) shows that large values of $n$, $r$, and $m$ are required to obtain small values of $R$. Therefore the reliability of the pattern recognizer can be increased by increasing the number of stored examples. In the practical application of this invention, however, the greater reliability obtained with a large number of examples must be balanced against the cost of providing a memory for storing the examples.

For fixed and even $n$, the smallest value of $R$ is obtained when $r=m=n$. Therefore, it is apparent that the examples should be designed so that the magnitudes of the quantities $r$ and $m$ are typically near to one-half $n$.

If, for a given $V$, it is impossible to find a $W$ such that $Z$ is refuted, then the number of points used to define $V$ is increased by one, and then more attempts are made to find a $W$ that refutes $Z$. But the extension of $V$ should be stopped when it can be determined that $R$ will exceed $\epsilon$ for any $W$. It is therefore necessary to compute the smallest possible value of $R$ for a given $V$.

Let $R_{min}$ be the smallest possible value of $R$ for a given $V$ when $V$ is fixed, $n$ and $r$ are fixed. Only $m$, which is determined by $W$, can vary. For fixed $n$ and $r$, the smallest possible value of $R$ occurs for $m=n-r$. Therefore, $R_{min}$ is equal to the value of $R$ for the case $m=n-r$. Thus, $$R_{\min}=\frac{(n-r)!r!}{n!} \quad (15)$$

The extension of $V$ is stopped when $R_{min} > \epsilon$, because in this case it is certain that a refutation is impossible.

DETAILED DESCRIPTION

Figure 3:
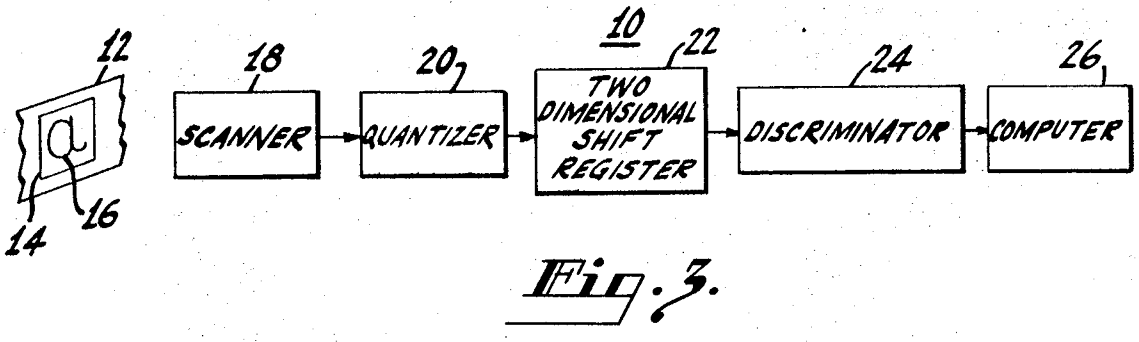
FIG. 3 is an overall block diagram of a pattern recognizer embodying the invention.

Referring now to FIG. 3, a pattern recognition system 10 embodying the invention includes a transport mechanism 12 for transporting a document 14 having an unknown pattern 16 handwritten thereon. The unknown pattern 16 is illustrated as the cursive script character "*a*." The transport mechanism 12 positions the document 14 so that the pattern 16 is optically read by a scanner 18. The scanner 18 may, for example, comprise a matrix of light-sensitive devices, such as photocells. The unknown pattern 16 is scanned by the scanner 18 and is then quantized in a quantizer 20 to produce pattern signals that are either all black or all white, with no intermediate shades of gray. A black pattern signal comprises a signal derived from the black outline trace of a pattern whereas a white pattern signal comprises a signal derived from the white background of the document 14. The unknown pattern signal is shifted into, and centered in, a two-dimensional flip-flop shift register 22. The unknown pattern signal stored in the register 22. The unknown pattern signal stored in the register 22 is assumed to represent an outline trace pattern, i.e., a stroke pattern that is one cell thick. A cell refers to a single flip-flop in the register 22. Such single-cell signals are also called black points or points throughout the specification.

The unknown-pattern signal in the shift register 22 is then operated on by a discriminator 24 which removes all isolated black point signals and also removes black point signals that are not smoothly connected to adjacent black point signals. Thus, isolated noise spikes as well as sharp cusps in the unknown pattern are removed. The now noiseless and smoothly shaped unknown pattern is transmitted from the discriminator 24 to a computer 26. The computer 26 comprises a general purpose computer that is organized to recognize the unknown pattern 16.

Figures 4, 5:
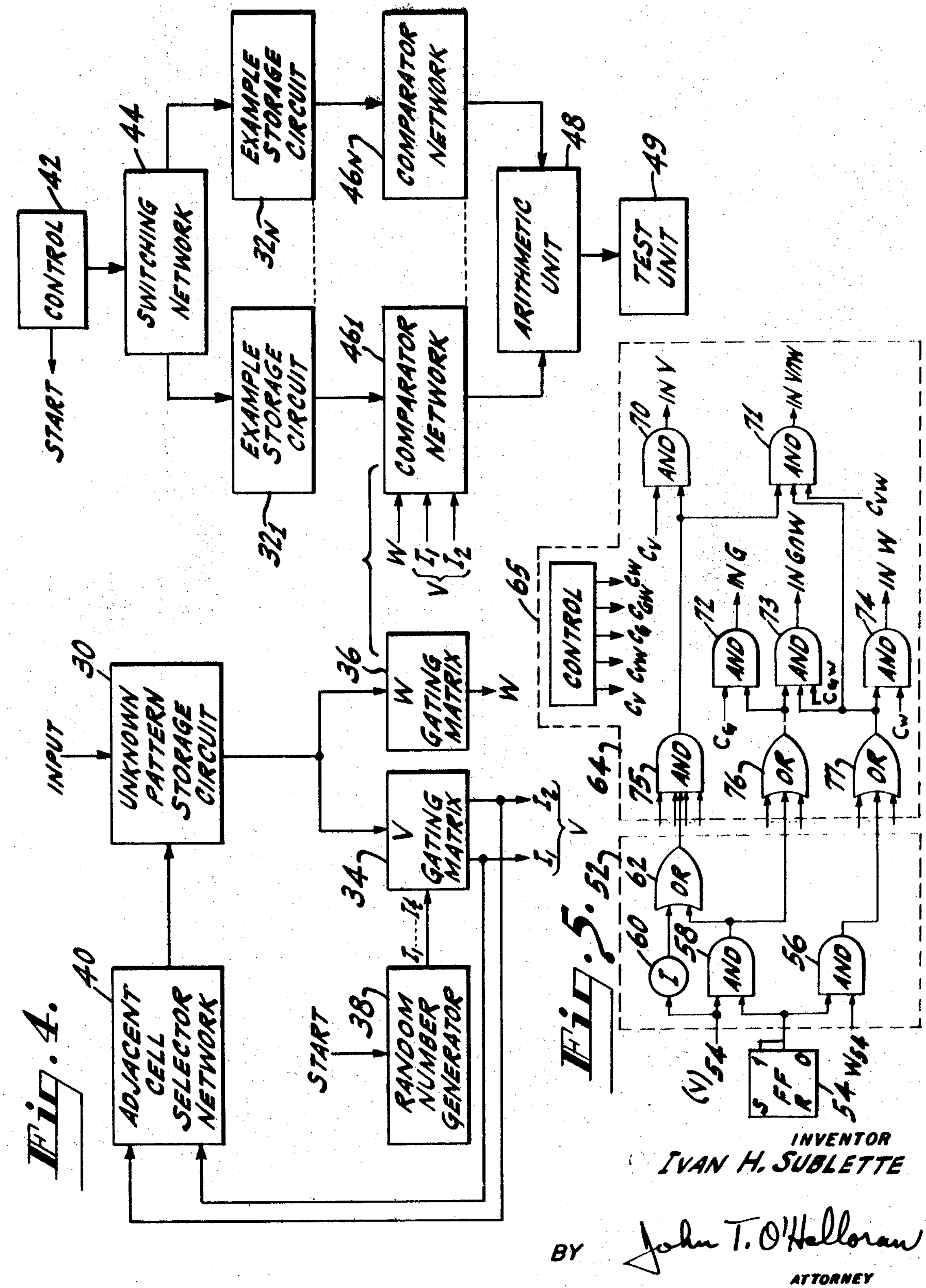
FIGS. 4, 5, 6, and 7 are block diagrams of portions of the pattern recognizer of FIG. 3.

In FIG. 4 there is shown a block diagram of the organization of the storage circuits of the computer 26. The computer 26 may, for example, comprise a planar type computer such as described in the articles "A Computer Oriented Toward Spatial Problems" by S. H. Unger, *Proceedings of the IRE, Oct.* 1958, and "Pattern Detection and Recognition" also. by S. H. Urgen *Proceeding of the IRE* Oct. 1959. These articles are incorporated by reference into this specification. The computer 26 includes an unknown pattern-signal storage circuit 30, as well as a plurality of storage circuits for storing a plurality of different examples of different classes of known patterns. The storage circuits $\mathbf{32}_1$ through $\mathbf{32}_N$ may, for example, store all $N$ example patterns in class $Z$. For instance, $N$ may be equal to 100, i.e., there may be 100 storage circuits 32 for the class $Z$. Additional storage circuits (not shown) are available for storing the examples in other classes. Each of the other classes may also include 100 different stored examples.

Each of the storage circuits 30, and $\mathbf{32}_1$ through $\mathbf{32}_N$ may, for example, comprise a two-dimension shift register storage circuit having a plurality of flip-flops interconnected to form a matrix of storage cells. The unknown pattern is effectively stored in outline trace form in the cells of the storage circuit 30 and as stated previously is one cell in width. The known pattern examples are also stored in outline form in the storage circuits $\mathbf{32}_1$ through $\mathbf{32}_N$, but the outlines of these patterns may be wider; for instance, they may be three cells in width. The extra width in each example increases the total number of examples that belong to the sets $V$ and $W$. The purpose of the extra width is to increase the likelihood that the condition $r=m=½n$ will be approximately satisfied in the Refutation Test. It will be recalled that this condition is desirable because it makes possible a small value of $R$.

The output of each storage cell in the storage circuit 30 is coupled to a separate AND gate in a $V$-gating matrix 34 as well as to a similar gate in a $W$-gating matrix 36. The gating matrices 34 and 36 comprise a plurality of gates having a one-to-one correspondence with the cells in the storage circuit 30 as well as in the storage circuits $\mathbf{32}_1$ through $\mathbf{32}_N$. A random-number generator 38 is coupled to the $V$-gating network 34 to select from the unknown pattern stored in the storage circuit 30 those points that are to be used for defining $V$. The random-number generator 38 initially selects one random point to define $V$ and then, if more points are needed for $V$, the generator 38 selects them one at a time, as needed. The gates selected by the random-number generator 38 in the $V$-gating matrix 34 produce $I_1 \ldots I_t$ signals that are applied to an adjacent cell-selector network 40. The network 40, which is coupled to the storage circuit 30, selects a black cell in the unknown pattern that is connected by a chain of black cells to one of the points used to define $V$. Such a selection in the storage circuit 30 causes one of the gates in the $W$-gating matrix 36 to be activated to produce an output signal that defines the single point of the subset $W$.

The class $Z$ storage circuits $\mathbf{32}_1$ through $\mathbf{32}_N$ are activated in sequence by a control network 42 and a switching network 44. Such activation is equivalent to hypothesizing that the unknown pattern belongs to the class $Z$. Each example in the class $Z$ is examined in turn. It is, of course, apparent that the other classes stored in the storage circuits of the computer 26 may be operated in parallel with the class $Z$ storage circuits.

Each of the storage circuits $\mathbf{32}_1$ through $\mathbf{32}_N$ is coupled to a corresponding comparator network $\mathbf{46}_1$ through $\mathbf{46}_N$. The comparator networks also have coupled thereto the signals from the gating matrices 34 and 36 that define $V$ and $W$. The comparator networks compare the points defining $V$ and $W$ with each stored example to determine whether it also exhibits these points. All of the comparators $\mathbf{46}_1$ through $\mathbf{46}_N$ are coupled to an arithmetic unit 48. The arithmetic unit 48 is in turn coupled to a test unit 49 that applies the refutation test and calculates $R$ and $R_{min}$, which were defined previously.

Referring to FIG. 5, there is shown a detailed logic diagram of a comparator network $\mathbf{46}_1$. The comparator network $\mathbf{46}_1$ includes an individual point network 52. The network 52 tests to see if an individual point used to define $V$ or $W$ is exhibited by an example of the class $Z$. The network 52 is duplicated for each individual cell in an example. Thus, for each individual cell in each storage circuit $\mathbf{32}_1$ through $\mathbf{32}_N$, a network 52 exists. An individual cell of the storage circuit $\mathbf{32}_1$ is shown by a flip-flop (F.F.) 54, having set (S) and reset (R) input terminals and corresponding (1) and (0) output terminals. A signal labeled $W$54 and derived from the gate in the $W$-gating matrix that corresponds to the flip-flop cell 54 is coupled to an AND gate 56 along with the output of the "1" output terminal of the flip-flop 54. Similarly, the output line of the gate in the $V$-gating matrix corresponding to the flip-flop cell 54 in the storage circuit $\mathbf{46}_1$ is coupled to an AND gate 58 as well as through an inverter 60 to an OR gate 62. The output of the AND gate 58 is also applied to the OR gate 62.

The individual point logic network 52, as well as all of the other individual point networks in the comparator $\mathbf{46}_1$ are coupled to a summarizing network 64. The summarizing network 64 effectively summarizes the status of the example by asking five questions. (1) Is the example in the set $V$?(2) Is the example in the set $V \cap W$?(3) Is the example in the set $G$?(4) Is the example in the set $G \cap W$?(5) Is the example in the set $W$?These questions are asked of each example in the class $Z$ by deriving from a control circuit 65 control signals $C_V$, $C_{VW}$, $C_G$, $C_{GW}$, and $C_W$ and applying these signals to AND gates 70, 71, 72, 73 and 74, respectively. The AND gate 70 to which $C_V$ is applied, denotes whether the example belongs to the set $V$. The other input to this gate 70 is derived from a summarizing AND gate 75. The inputs to the AND gate 75 are derived from the OR gate 62 as well as from all of the other OR gates in the $_{GW}$, and C comparator $46_1$ that correspond to gate 62 for the other points in the example. Summarizing OR gates 76 and 77 are also included in the summarizing network 64 to indicate whether the example belongs to the set $G$ or to the set $W$, respectively. The inputs to the OR gate 76 are derived from the AND gate 58 as well as from all of the other AND gates in the comparator $46_1$ that correspond to the gate 58 for the other points in the example. The inputs to the OR gate 77 are derived from the AND gate 56 as well as from all of the other AND gates in the comparator $46_1$ that correspond to the gate 56 for the other points in the example. The outputs of the AND gate 75 and the OR gates 76 and 77 are fed to the AND gates 70, 71, 72, 73, and 74. The outputs from the AND gates 70, 71, 72, 73, and 74 indicate that the example belongs to the sets $V$, $V \cap W$, $G$, $G \cap W$, and $W$, respectively.

Figures 6, 7:
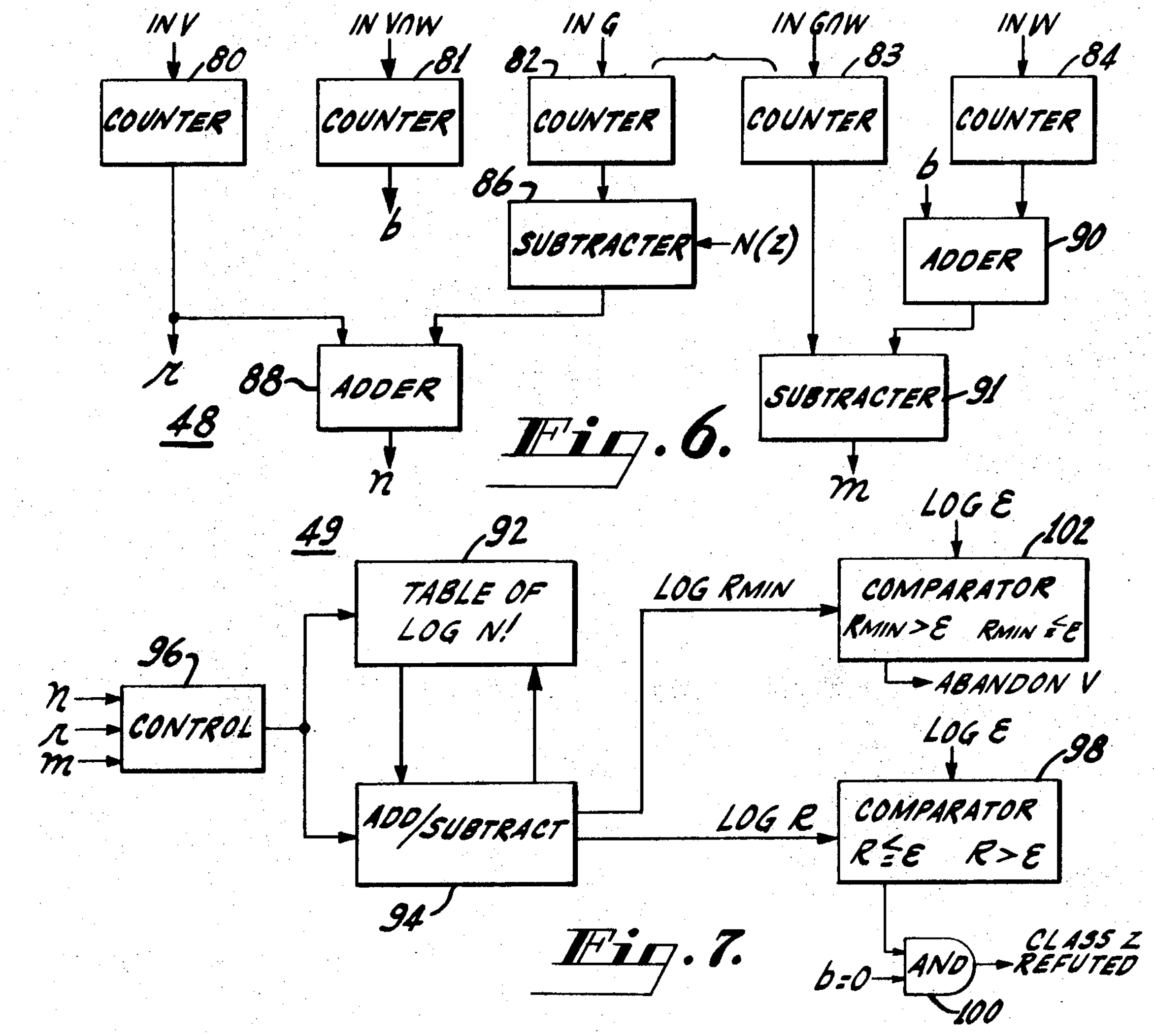

Referring now to FIG. 6, the arithmetic unit 48 for the computer 26 is shown in detail. The arithmetic unit 48 derives the values $n$, $r$ and $m$ defined in the equations 6, 7, and 8. The value of $n$, which is defined by equation (6), is computed from the output of the summarizing logic of FIG. 5 as follows:

$$\begin{aligned} M=N(J_Z)&=N[(V\cap Z)\cup(\bar{G}\cap Z)] \\ &=N(V\cap Z)+N(\bar{G}\cap Z) \\ &=N(V\cap Z)+[N(Z)-N(G\cap Z)] \qquad (16) \end{aligned}$$

where $N(S)$ denotes the number of the examples belonging to any set $S$.

Equation (7) becomes $$r=N(V\cap J_Z)=N(V\cap Z) \qquad (17)$$

Equation (8) becomes $$\begin{aligned} m=N(W\cap J_Z)&=N(W\cap Z)-N(V\cap\bar{G}\cap W\cap Z) \\ &=N(W\cap Z)-[N(G\cap W\cap Z)-N(V\cap W\cap Z)] \qquad (18) \end{aligned}$$

Figures 9, 10:
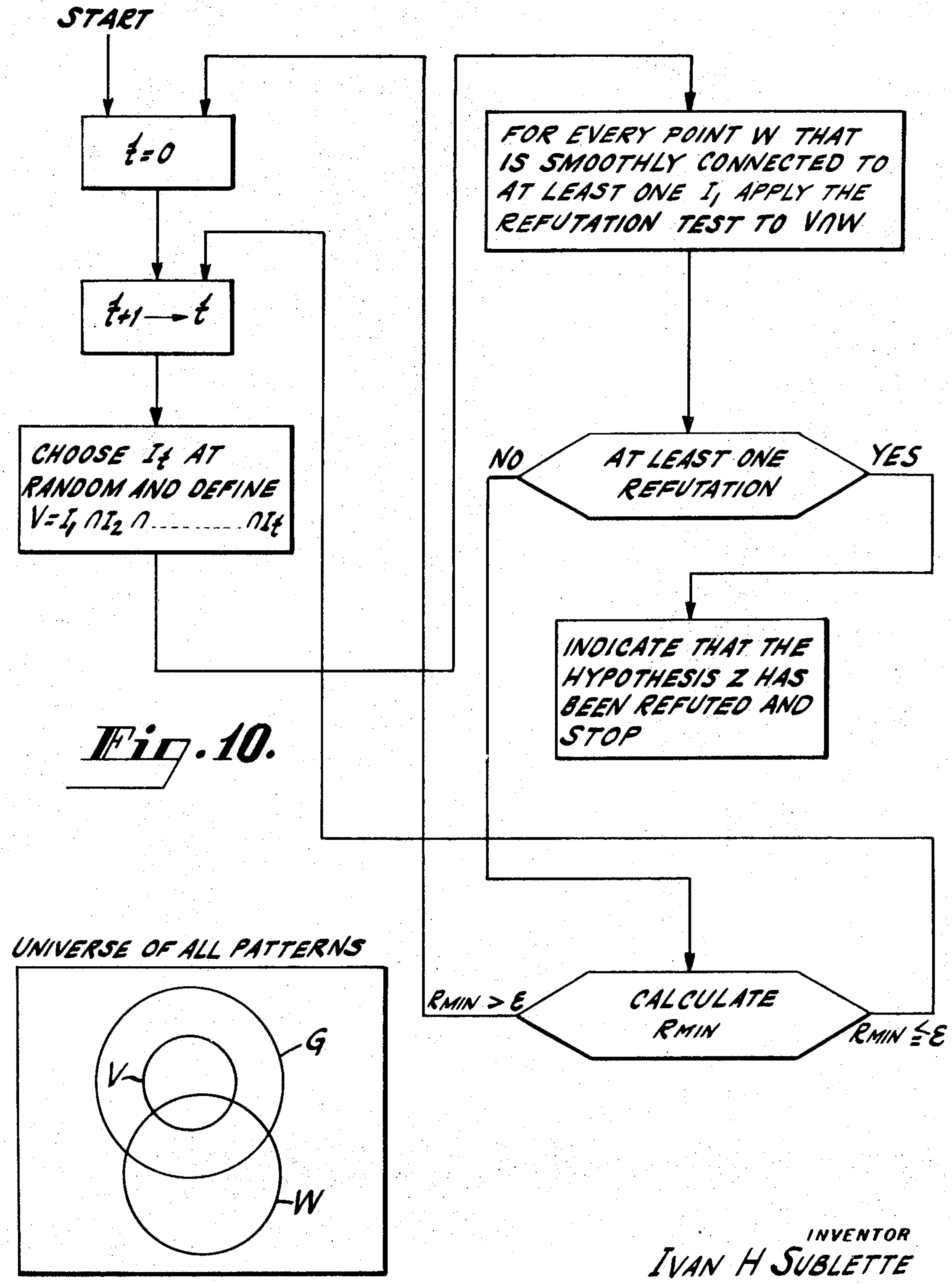
FIG. 9 is a Venn diagram helpful in understanding the invention.
FIG. 10 is a flow chart listing the steps that occur in the pattern recognizer of FIG. 3.

The correctness of equations (16) through (18) can be verified with the aid of the Venn diagram shown in FIG. 9.

To provide these values, $n$, $r$, and $m$, the counters 80, 81, 82, 83, and 84 in FIG. 6 are coupled to AND gates 70 through 74 respectively to count the outputs of these gates as each example is sequentially examined. The counter 80 provides the value $r$ directly for all of the examples in the class $Z$. The counter 82 is coupled to a subtract circuit 86 to subtract from the fixed number of examples in class $Z$, $N(Z)$, the number of examples in the set $G$. The difference output from the subtractor circuit 86 is added in an adder 88 to the output of the counter 80 to provide $n$. The outputs of the counters 81 and 84 are added in an adder 90 and this sum is applied to a subtracter circuit 91 where the output of the counter 83 is subtracted therefrom. The difference is $m$. The adder subtracter pairs 88, 86 and 90, 91 may comprise a single add/subtract circuit, but they are shown separately in FIG. 6 for clarity.

As shown in FIG. 7, all of the outputs $n$, $r$, and $m$ are applied to a test unit 49 to determine whether or not the class $Z$ should be refuted. The test unit 49 includes a submemory 92 that has stored therein a table of logarithms of factorials so that the equations (12) and (15) may be solved by merely addition and subtraction. An adder-subtracter circuit 94 is therefore included in test unit 49 to accomplish such addition and subtraction. A control unit 96 sequences the outputs $n$, $r$, and $m$ to look up the logarithms of the factorials of these numbers in the table 92 and to apply the logarithms of the factorials of these numbers to the adder-subtracter 94. The logarithm of the factor $R$ when obtained from the adder-subtracter 94 is applied to a comparator 98 along with the logarithm of the significance level $\epsilon$ When $\log \epsilon \geqq \log R$, the output of the comparator 98 is applied to an AND gate 100. The other input to the gate 100 is an indication from the counter 81 that $b=N(V \cap Z)=0$. The gate 100, when activated, signals that class $Z$ is refuted as being the true identity of the unknown pattern. When $\log R > \log \epsilon$, class $Z$ is not yet refuted.

The logarithm of the factor $R_{min}$ obtained from the adder-subtracter 98 is applied to a comparator 102 also with the logarithm of the significance level $\epsilon$. When $\log R_{min} 22 \log \epsilon$, the present $V$ set should be abandoned, because it then is impossible to obtain the condition $R \leqq \epsilon$.

OPERATION

Figure 8:
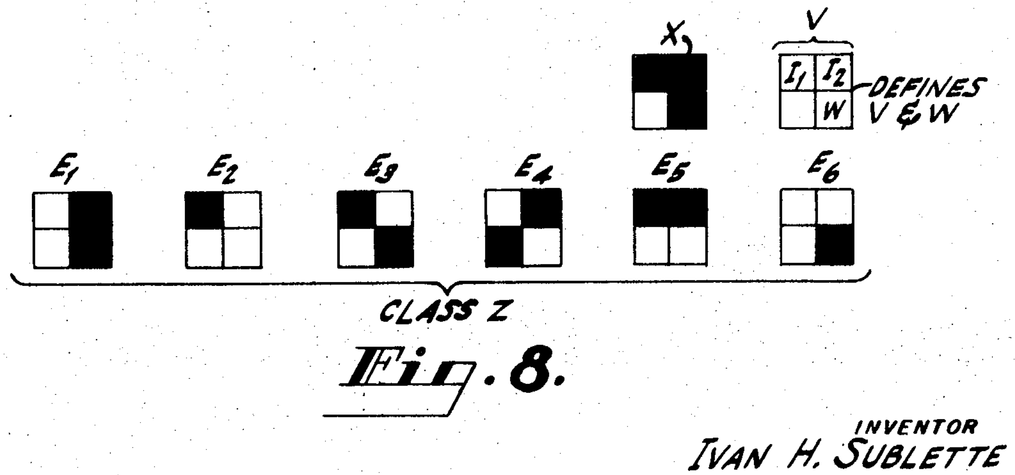
FIG. 8 contains illustrations of patterns that are helpful in understanding the operation of the pattern recognizer.

In describing the operation of the pattern recognizer 10, it is assumed that the unknown pattern X in FIG. 8 is the pattern that is to be recognized and that the examples $E_1$ through $E_6$ of the known pattern class $Z$ are the only examples in the class $Z$. These patterns each comprise a matrix of four points. Such an uncomplicated situation is introduced merely to illustrate the operation of the pattern recognizer 10 and does not represent the complexity of actual recognition problems the pattern recognizer 10 needs to solve. Furthermore, in the pattern recognizer 10, the line width of the examples is typically three times greater than that of the unknown pattern.

The unknown pattern X is scanned by the scanner 18 (FIG. 3) and quantized by the quantizer 20 to provide either black or white pattern signals and these signals are shifted into the shift register 22. All extraneous noise spots are then deleted from the pattern X by the discriminator 24. Additionally, the discriminator 24 removes any black points not smoothly connected to adjacent black points so that a smoothly connected outline trace of the unknown pattern is shifted into the unknown-pattern-storage circuit 30 in the computer 26. The examples $E_1$ through $E_6$ are stored in class $Z$ storage circuits $32_1$ through $32_6$ in the computer 26.

The control circuit 42 starts the random-number generator 38 which in turn activates a pair of gates in the $V$-gating matrix 34 to randomly select the points $I_1$ and $I_2$ used to define $V$. The locations of these points in the unknown pattern X are assumed to be those shown in FIG. 8. Corresponding gates in the $V$-gating matrix 34, are activated to produce output signals that are applied to the adjacent cell selector 40. The adjacent cell selector 40 selects a black cell $W$ in the storage circuit 30 that is connected by a chain of black cells to one of the matrix points $I_1$ and $I_2$. It is assumed that $W$ is the cell labeled as $W$ in FIG. 8. Consequently, the cell $W$ selected in the storage circuit 30 activates the corresponding gate in the $W$-gating network 36 and produces an output therefrom. The signals that define $V$ and $W$ are applied to all of the comparator networks $46_1$ through $46_6$.

Referring to FIG. 5, the comparator $46_1$ compares the example $E_1$ stored in the class $Z$ storage circuit $32_1$, with the $V$ and $W$ signals to determine whether or not $E_1$ exhibits the corresponding points. Assuming the flip-flop 54 of the storage circuit $32_1$ comprises the storage cell corresponding to $I_1$, this flip-flop is in the reset state because $E_1$ is not black in this cell. Accordingly, the gates 56 and 58 are blocked. The $I_1$ signal, from the $V$-gating network 34, is inverted in the inverter 60 and produces no output from the OR gate 62. Consequently, there is no output from the OR gate 62. Consequently, there is no output in the summarizing logic 64 for this point.

The flip-flop corresponding to the individual black point $I_2$ in the storage circuit $32_1$ does provide an enabling signal to the gates corresponding to 56 and 58, because $E_1$ does exhibit a black cell $I_2$. The AND gate corresponding to the gate 58 for this cell is activated by the $I_2$ signal from the gating network 34. The gate corresponding to OR gate 62 for this cell is activated to denote that $E_1$ belongs to set $G$. The AND gate 75 is not activated because the example $E_1$ does not exhibit a black cell $I_1$.

The $W$ signal from the gating network 36 does produce an output from the OR gate 77 in the comparator network $46_1$ because example $E_1$ does exhibit the black cell $W$. The control circuit 65 sequentially enables the AND gates 70 through 74 to determine which of these gates are enabled. For the example, $E_1$, only the AND gates 72, 73 and 74 are activated denoting that $E_1$ belongs to the sets $G$, $G \cap W$ and $W$. The control and switching circuits 42 and 44 in FIG. 4 switch to the second example $E_2$ storage circuit $32_2$ and second network comparator $46_2$. Listed below in table I are the output signals produced by a comparison with each example in the class $Z$.

TABLE I

| | V | $V\cap W$ | G | $G\cap W$ | W | Z |
|---|---|---|---|---|---|---|
| $E_1$ | 0 | 0 | 1 | 1 | 1 | 1 |
| $E_2$ | 0 | 0 | 1 | 0 | 0 | 1 |
| $E_3$ | 0 | 0 | 1 | 1 | 1 | 1 |
| $E_4$ | 0 | 0 | 1 | 0 | 0 | 1 |
| $E_5$ | 1 | 0 | 1 | 0 | 0 | 1 |
| $E_6$ | 0 | 0 | 0 | 0 | 1 | 1 |
| Total count | 1 | 0 | 5 | 2 | 3 | 6 |

After comparing the $V$ and $W$ signals with all the examples in the class $Z$, the counter 81 is still 0 denoting that $b=0$, i.e., that no examples belong to the set $V\cap W$. The arithmetic and test units 48 and 49 therefore now apply the refutation test. The arithmetic unit 48 adds and subtracts the various counts in the counters 80 through 84 in accordance with the equations (16), (17), and (18). The values of $n$, $r$, and $m$ needed to compute the probability $R$ of equation (12) are found to be 2, 1, and 1, respectively. The control circuit 96 of the test unit 49 of FIG. 7 thereupon causes the logarithms of the factorials in equation (12) to be looked up in the table 92 and added and subtracted in the adder/subtracter 94. In this case $$\log R=\log\frac{(n-r)!(n-m)!}{n!(n-r-m)!}$$

$$=\log\frac{(2-1)!(2-1)!}{2!(2-1-1)!}=\log\frac{1!1!}{2!}=\log\frac{1}{2}$$

Accordingly, for any $\epsilon\geq 1/2$ the AND gate 100 would produce a refutation signal indicating that hypothesis $Z$ has been refuted.

The method of hypothesizing the class $Z$ of an unknown pattern and then attempting to refute the hypothesis $Z$ is the same for each class and is summarized in the steps below:

1. Select a black point in the unknown pattern at random and use it to define the set of patterns $V$.
2. For every black point $W$ in the unknown pattern that is smoothly connected to one of the points defining $V$, carry out the following steps:

Compare the points used to define $V$ and $W$ with a plurality of different class $Z$ examples to determine the number of class $Z$ examples belonging to $$V\cap J_Z,\ W\cap J_Z,\ V\cap W\cap J_Z,$$

and $J_Z$; apply the refutation test and refute the class $Z$ when $b=0$ and $$R=\frac{(n-r)!(n-m)!}{n!(n-r-m)!}\leq\epsilon$$

where $r=N(V\cap J_Z)$, $m=N(W\cap J_Z)$, and $b=N(V\cap W\cap J_Z)$;

If there is at least one refutation of class $Z$, then reject the hypothesis that the unknown pattern belongs to class $Z$, and stop; otherwise, proceed to the next step.

3. Compute the quantity $$R_{min}=\frac{(n-r)!r!}{n!}$$

where $n$ and $r$ are defined above. If $R_{min}\leq\epsilon$, choose a black point at random from the unknown pattern, add this point to the definition of $V$, and then return to step 2. If $R_{min}<\epsilon$, return to step 1.

A flow chart of the above procedure is shown in FIG. 10. This procedure can be executed simultaneously for all possible classes. As soon as there exists exactly one class that has not been refuted, it is decided that the unknown pattern belongs to the nonrefuted class.

Thus, a pattern recognizer is provided that recognizes unknown patterns by hypothesizing their identity and testing to see whether or not the hypothesis can be refuted. It is to be noted a pattern recognizer embodying the invention reads cursive script as well as hand printing and the classes of pattern may correspond either to entire words or to individual characters.

What is claimed is:

1. A pattern recognizer for recognizing an unknown pattern, comprising in combination, means for storing a plurality of classes of known patterns, means for selecting known patterns from said storage means to hypothesize the identity of said unknown pattern, means for selecting first and second arrays of points from said unknown pattern to define a subpattern, means for comparing said first and second arrays with said selected patterns, first and second means for counting the number of times said first and second arrays of points respectively appear in said selected patterns, means for counting the number of times said subpattern appears in said selected patterns, means for refuting said hypothesis for a selected pattern that exhibits a plurality of separate occurrences of said first and second arrays but substantially no occurrences of said subpattern, and means for designating a particular selected pattern as the identity of said unknown pattern when said particular selected pattern cannot be refuted because of a plurality of occurrences therein of said subpattern.

2. The combination in accordance with claim 1 wherein said first array of points comprises a plurality of selected points and said second array of points comprises a single point continuously connected to one of said points in said first array of points.

3. The combination in accordance with claim 2 wherein each class includes a plurality of differently shaped examples.

4. The combination in accordance with claim 3 wherein said selection of said known pattern is refuted when a majority of examples of said known pattern exhibit said first array of points and a majority of examples of said known pattern exhibit said second array of points but few examples possess the combination of said first and second arrays of points.

5. The method of determining the identity of an unknown pattern exhibiting an outline trace including contiguous points comprising the steps of electro-optically scanning said unknown pattern, randomly selecting first and second arrays of points from said scanned unknown pattern to define a subpattern, selecting known patterns exhibiting outline traces including contiguous points to hypothesize the identity of said unknown pattern, comparing said first and second arrays of points with said selected known patterns, counting the number of times said first and second arrays of points appear separately in said selected known patterns, counting the number of times said subpattern appears in said selected known patterns, refuting each selected known pattern that exhibits a plurality of separate occurrences of said first and second arrays of points but substantially no occurrence of said subpattern, and designating a particular selected known pattern as the identity of the unknown pattern when said particular selected known pattern cannot be refuted because of a plurality of occurrences therein of said subpattern.